US006957176B2

(12) United States Patent
Yoshizawa

(10) Patent No.: US 6,957,176 B2
(45) Date of Patent: Oct. 18, 2005

(54) REDUCTION PROCESSING METHOD AND COMPUTER READABLE STORAGE MEDIUM HAVING PROGRAM STORED THEREON FOR CAUSING COMPUTER TO EXECUTE THE METHOD

(75) Inventor: Keiji Yoshizawa, Nagano (JP)

(73) Assignee: Shinko Electric Industries Co., Ltd., Nagano (JP)

(*) Notice: Subject to any disclaimer, the term of this patent is extended or adjusted under 35 U.S.C. 154(b) by 740 days.

(21) Appl. No.: 09/886,354

(22) Filed: Jun. 21, 2001

(65) Prior Publication Data

US 2001/0055033 A1 Dec. 27, 2001

(30) Foreign Application Priority Data

Jun. 22, 2000 (JP) ........................................ 2000-188197

(51) Int. Cl.[7] .......................... G06F 17/50; G06F 17/10; G06G 7/62
(52) U.S. Cl. ................................ 703/2; 703/13; 703/14; 716/19; 716/20; 716/21
(58) Field of Search ................................ 703/13–14, 2; 716/19–21

(56) References Cited

U.S. PATENT DOCUMENTS

| | | | | |
|---|---|---|---|---|
| 5,553,273 A | * | 9/1996 | Liebmann | 716/21 |
| 5,553,274 A | * | 9/1996 | Liebmann | 716/21 |
| 5,740,068 A | * | 4/1998 | Liebmann et al. | 716/21 |
| 6,470,489 B1 | * | 10/2002 | Chang et al. | 716/21 |
| 6,516,459 B1 | * | 2/2003 | Sahouria | 716/21 |
| 6,546,543 B1 | * | 4/2003 | Manabe et al. | 716/21 |
| 6,687,885 B2 | * | 2/2004 | Ono | 716/5 |

FOREIGN PATENT DOCUMENTS

JP 05334395 12/1993
JP 08227431 9/1996

OTHER PUBLICATIONS van den Hove et al. "Optical Lithography Techniques for 0.25um and Below: CD Control Issues." Proc. of Technical Papers, 1995 Int'l Symposium on VLSI Technology, Systems and Applications. May–Jun. 1995. pp. 24–30.*

Garofalo, J. et al. "Automatic Proximity Correction for 0.35um I–line Photolithography." 1994 NUPAD V. Jun. 1994. pp. 92–94.*

Baird, M. "EYESEE: A Machine Vision System for Inspection of Integrated Circuit Chips". Proc. 1985 IEEE Int'l Conf. on Robotics and Automation. Mar. 1995. pp. 444–448.*

Ito, M. "An Automated System for LSI Fine Pattern Inspection Based on Comparison of SEM Images and CAD Data." 1995 IEEE Int'l Conf. on Robotics and Automation. May 1995. col. 1, pp. 544–549.*

* cited by examiner

Primary Examiner—Kevin J. Teska
Assistant Examiner—Ayal Sharon
(74) Attorney, Agent, or Firm—Paul & Paul

(57) ABSTRACT

The invention relates to a reduction processing method including a step for eliminating an "inside-out side", contained in the sides of an offset figure generated by sizing a source figure. The inside-out side detected by the presence of a first intersection point at which adjacent offset locus line segments intersect. The step includes i) deleting the offset vertices each of which is located at one end of one of the offset locus line segments intersecting at the first intersection point, and ii) revising the offset figure by finding a second intersection point at which offset figure line segments, which form the offset figure by joining the offset vertices, intersect each other, and by setting the second intersection point at the position of the detected offset vertices as an offset vertex.

12 Claims, 15 Drawing Sheets

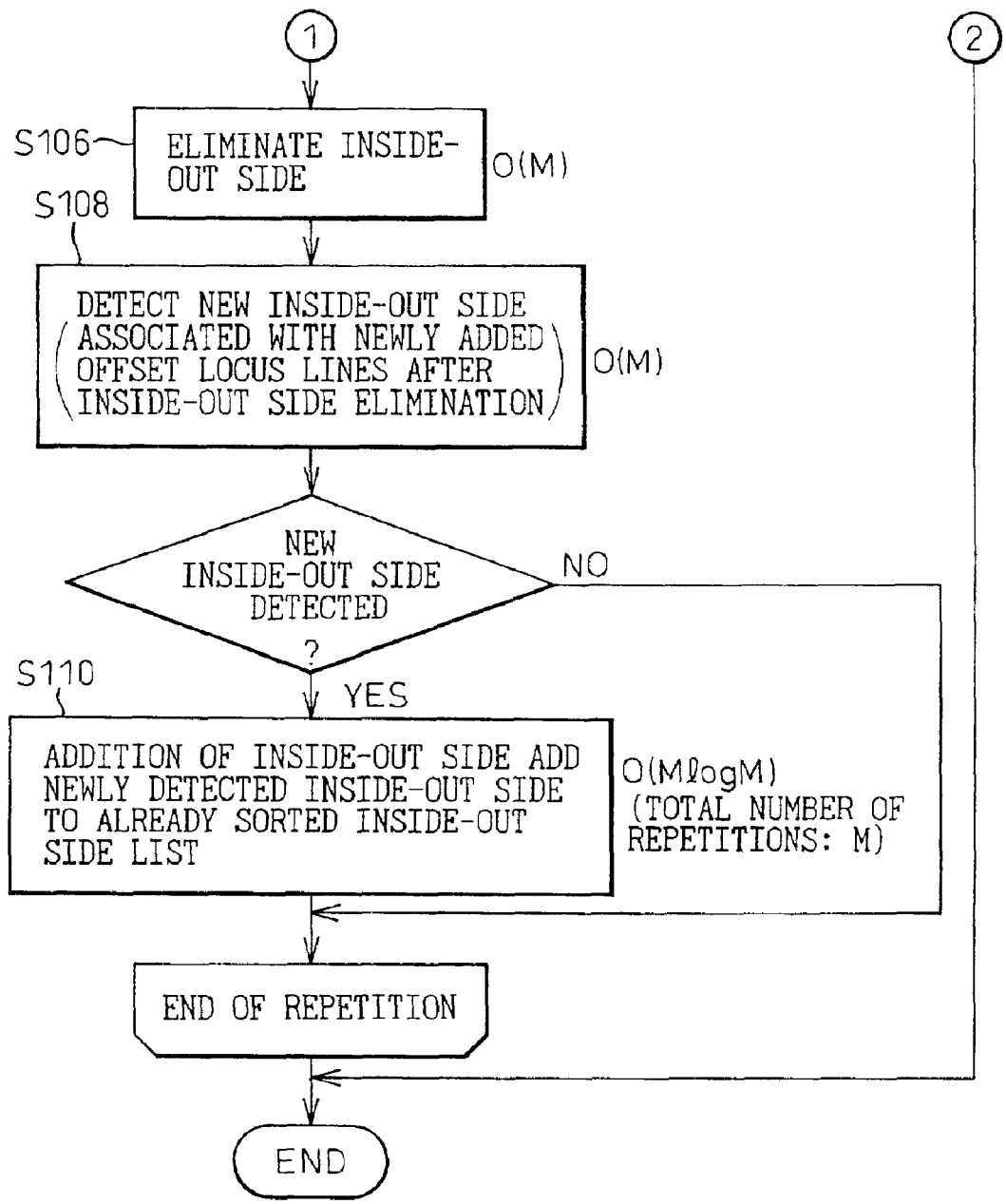

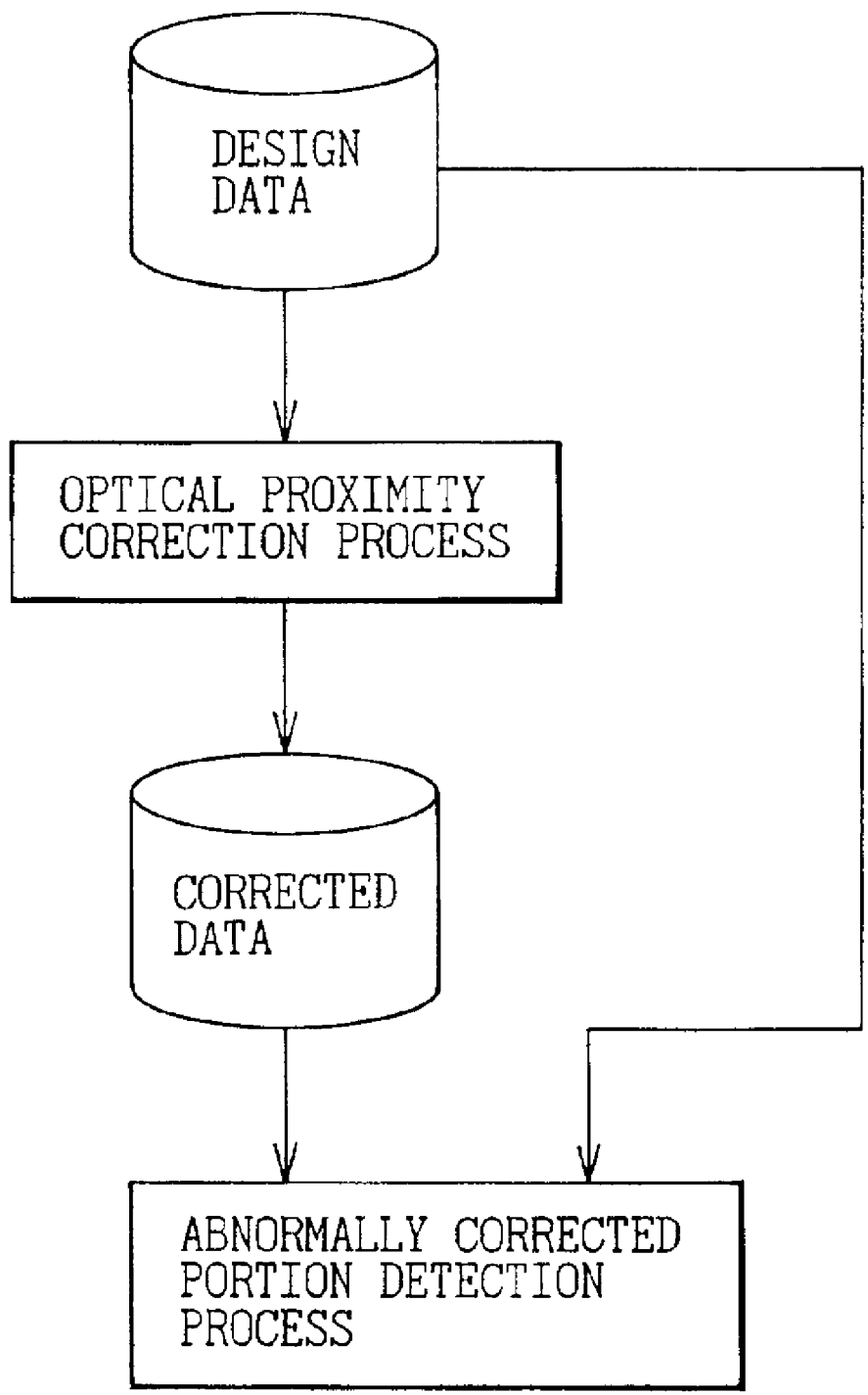

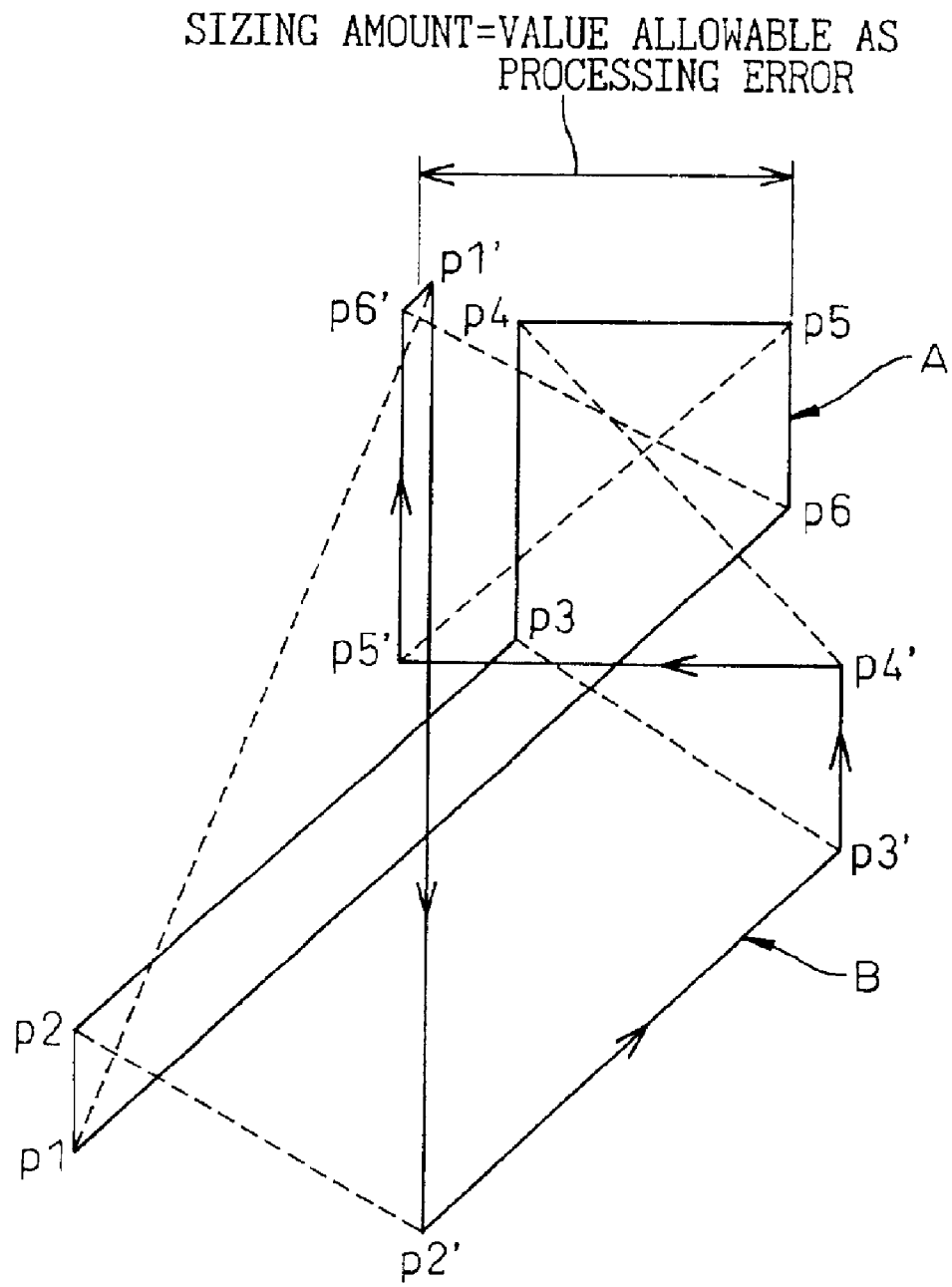

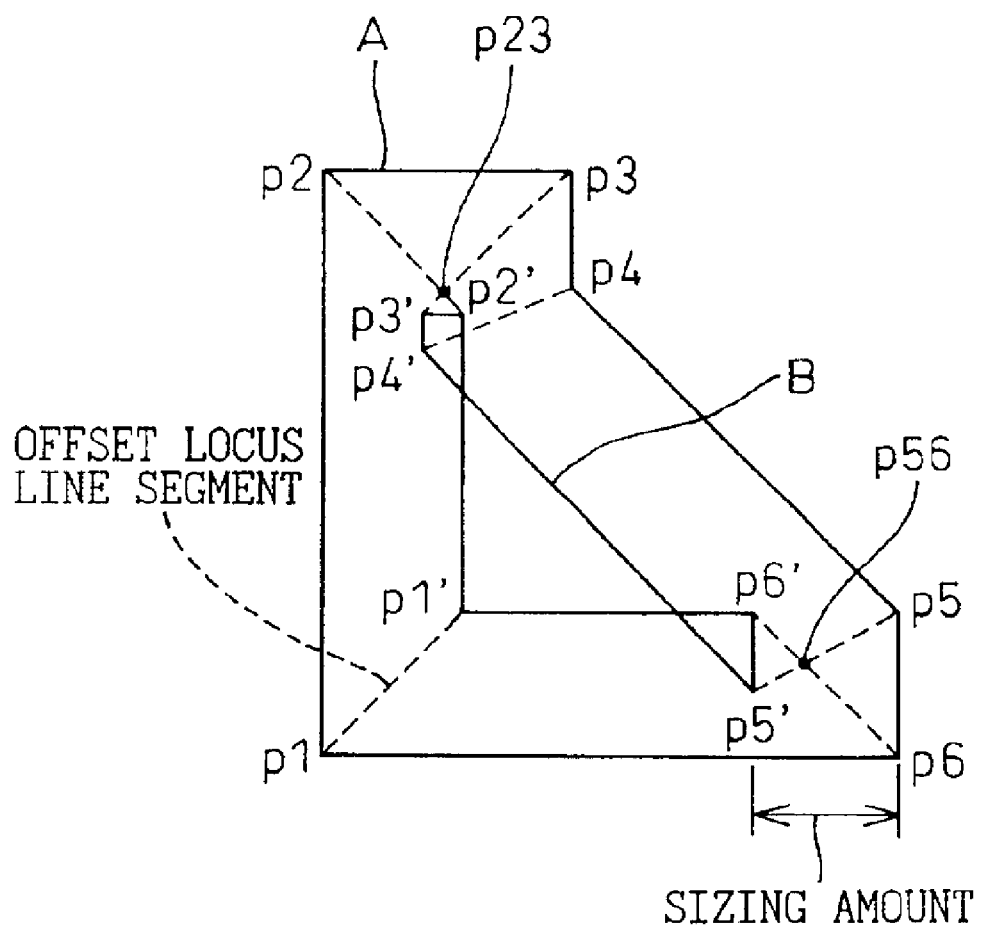

REDUCTION PROCESSING METHOD AND COMPUTER READABLE STORAGE MEDIUM HAVING PROGRAM STORED THEREON FOR CAUSING COMPUTER TO EXECUTE THE METHOD

BACKGROUND OF THE INVENTION

1. Field of the Invention

The present invention relates to a reduction processing method in which reduction is applied to a difference figure produced by overlaying an original geometric figure on a new geometric figure generated by applying graphics processing to the original figure, or produced by overlaying two new geometric figures generated by applying different processing operations to an original geometric figure, and the validity of the operation is verified based on the size of the remaining figure. The invention also relates to a computer readable storage medium having a program stored thereon for causing a computer to carry out the reduction processing.

2. Description of the Related Art

In geometrical processing such as LSI mask pattern processing, the following two verification methods are traditionally employed to verify the validity of the data generated by geometrical processing.

In the first verification method, as disclosed in Japanese Unexamined Patent Publication No. 8-160598, first a difference figure is obtained by overlaying an original geometric figure (design data) on a new geometric figure generated by applying a geometrical processing operation (for example, optical proximity correction) to the original figure, in other words, the two geometric figures are XORed to produce the difference figure. Then, verification is made based on the size of the difference figure; that is, if the difference figure is large, it is determined that a problem has occurred in the geometrical processing and there is an error in the new figure generated by the geometrical processing. On the other hand, if the difference figure is smaller than a specified value, then it is determined that no problem has occurred in the geometrical processing and, therefore, there is no error in the new figure generated by the geometrical processing, that is, the new figure is judged to be normal.

In the second verification method, different processing systems using different algorithms or procedures, though the purpose of processing is the same, are applied to the original geometric figure and, as is done in the first verification method, a difference figure between the two new geometric figures generated by the respective systems is obtained; then, verification is made based on the size of the difference figure, and if the difference figure is large, it is determined that there is a problem in one or the other of the geometrical processing systems, that is, there is an error in either one of the new figures. On the other hand, if the difference figure is smaller than a specified value, both of the new figures are judged to be normal.

As a means for determining whether the difference figure is large or small, generally, a reduction technique is employed that applies reduction to the difference figure. That is, after reduction with a suitable sizing amount is applied to the difference figure, if the difference figure disappears, it is determined that the difference figure is small; otherwise, it is determined that the difference figure is large.

The reduction process consists of an offsetting step, in which an imaginary straight line drawn on each side of a source figure acquired as a difference figure from two original geometric figures is translated (offset) inwardly of the source figure by a distance equal to a prescribed sizing amount and an offset figure is generated by joining the intersection points of the thus offset imaginary straight lines, and an ORing step, in which an OR operation is performed on the offset figure to generate a final offset figure.

Conceptually, reduction is a process for thinning the source geometric figure by an amount equal to a sizing amount. Accordingly, when reduction is applied to the source figure by making the sizing amount, also called the offset amount, larger than the size of the source figure, the source figure should in principle disappear. As a result, when applying reduction, for example, to a difference figure representing the difference between an original geometric figure and a geometric figure generated by processing the original geometric figure, if a suitable sizing amount is chosen that can allow for the error, the error between the two geometric figures can be determined.

When reduction is applied to the source figure, the source figure should disappear as a result of the processing, even if the sizing amount is larger than the source figure, but there are cases where even when an OR operation is applied to the offset figure after the offsetting step, an "inside-out side", occurs and the source figure does not disappear.

The inside-out side will be described below. When the line segment joining one vertex of the source figure to the corresponding vertex of the offset figure is designated an offset line segment, there are cases where two adjacent offset line segments intersect each other. That the two adjacent offset lines intersect each other means that when one side of the source figure is offset by a distance equal to a sizing amount, this affects the slope of its adjacent side of the source figure and causes the orientation of the side of the offset figure to be reversed from the orientation of the corresponding side of the source figure. The one side of the offset figure at the ends of which these two offset line segments terminate is called the "inside-out side".

As a result, there can occur cases where when the difference figure, i.e., the source figure, should disappear as a result of the reduction processing, and the result of the verification should be judged to be good, in actuality the source figure does not disappear because of the occurrence of the inside-out side and the result of the verification cannot be judged to be good.

To address this situation, various processing methods that can solve the problem caused by such an inside-out side have been proposed in the prior art. For example, in a first sizing processing method, the processing is performed by generating two offset points for each vertex of the source figure. When the vertex is one whose interior angle is smaller than 180°, for example, its two offset points consist of the point to which the vertex has been moved when one side associated with that vertex has been translated by a distance equal to the sizing amount, and the point to which the vertex has been moved when the other side associated with that vertex has been translated by the same distance. On the other hand, when the vertex is one whose interior angle is greater than 180°, its offset point is the point of intersection between an imaginary line translated by a distance equal to the sizing amount from one side associated with that vertex and an imaginary line translated by the same distance from the other side associated with that vertex.

In a second sizing processing method, a technique is employed that obtains a final offset figure by applying offset to each side of the source figure repetitively in small increments, because when each side of the source figure is offset in a single operation, an inside-out side occurs in the final offset figure.

However, of the above-described improved reduction processing methods, the first sizing processing method has the problem that it takes a long time for OR operations since the processing is performed by generating two new vertices for each vertex of the source figure.

On the other hand, the second sizing processing method has the problem that calculation errors contained in the final offset points (vertices of the offset figure) increase as the offset shape is obtained in a stepwise manner.

In view of the above situation, the present invention is aimed at solving the above problems and, in the reduction processing of the present invention, inside-out side elimination processing is applied to each inside-out side in the order of occurrence of the inside-out side in the offset figure. It is accordingly an object of the present invention to provide a reduction processing method that can reduce the amount of computation, is fast, and is capable of performing precise sizing.

SUMMARY OF THE INVENTION

A reduction method according to the present invention comprises: an offset figure generating step for generating, based on a geometric figure having a plurality of vertices, an offset figure by translating sides, formed by joining the vertices, inwardly of the geometric figure by a distance equal to a prescribed sizing amount; an offset locus line segment generating step for generating an offset locus line segment by joining each of the vertices to an offset vertex corresponding to the vertex, the offset vertex being located on the offset figure; an intersection point detecting step for detecting a first intersection point at which offset locus line segments associated with an adjacent pair of the vertices intersect each other; an offset vertex deleting step for deleting the offset vertices each located at one end of one of the offset locus line segments intersecting at the first intersection point; and an offset figure revising step for revising the offset figure by finding a second intersection point at which offset figure line segments, forming the offset figure by joining the offset vertices, intersect each other, and by setting the second intersection point as an offset vertex in place of the deleted offset vertices.

In the intersection point detecting step, the detected first intersection point is sorted in order of increasing distance from the side of the geometric figure which is associated with the first intersection point, and in the offset vertex deleting step, the offset vertices associated with the first intersection point are deleted in accordance with the sorted order; further, in the intersection point detecting step, if two offset figure line segments extending from the respective offset vertices associated with the detected first intersection point are parallel to each other, an imaginary straight line passing through the first intersection point and extending parallel to the two offset figure line segments is drawn, third intersection points are found each defining a point at which an offset locus line segment associated with the offset vertex at an opposite end of one of the two offset figure line segments intersects the imaginary straight line, and of the third intersection points thus found, the third intersection point nearer to the first intersection point is selected, while in the offset vertex deleting step, the offset vertices associated with the sorted first intersection point and the offset vertex on the offset locus line segment associated with the selected third intersection point are deleted.

A computer readable storage medium according to the present invention stores thereon a reduction processing program for causing a computer to execute program steps comprising: an offset figure generating step for generating, based on a geometric figure having a plurality of vertices, an offset figure by translating sides, formed by joining the vertices, inwardly of the geometric figure by a distance equal to a prescribed sizing amount; an offset locus line segment generating step for generating an offset locus line segment by joining each of the vertices to an offset vertex corresponding to the vertex, the offset vertex being located on the offset figure; an intersection point detecting step for detecting a first intersection point at which offset locus line segments associated with an adjacent pair of the vertices intersect each other; an offset vertex deleting step for deleting the offset vertices each located at one end of one of the offset locus line segments intersecting at the first intersection point; and an offset figure revising step for revising the offset figure by finding a second intersection point at which offset figure line segments, forming the offset figure by joining the offset vertices, intersect each other, and by setting the second intersection point as an offset vertex in place of the deleted offset vertices.

In the intersection point detecting step, the detected first intersection point is sorted in order of increasing distance from the side of the geometric figure which is associated with the first intersection point, and in the offset vertex deleting step, the offset vertices associated with the first intersection point are deleted in accordance with the sorted order; further, if two offset figure line segments extending from the respective offset vertices associated with the detected first intersection point are parallel to each other, an imaginary straight line passing through the first intersection point and extending parallel to the two offset figure line segments is generated, third intersection points are found each defining a point at which an offset locus line segment associated with the offset vertex at an opposite end of one of the two offset figure line segments intersects the imaginary straight line, and of the third intersection points thus found, the third intersection point nearer to the first intersection point is selected, while in the offset vertex deleting step, the offset vertices associated with the sorted first intersection point and the offset vertex at the opposite end of the offset locus line segment associated with the selected third intersection point are deleted.

Another reduction processing method according to the present invention is one that is applied to a difference figure generated by overlaying two geometric figures, to verify based on the size of the difference figure the validity of processing applied to each of the geometric figures, and comprises: a first vertex set storing step for storing a set of vertices included in the difference figure as a first vertex set; an offset figure generating step for translating an imaginary straight line from each side of the difference figure inwardly of the figure by a distance equal to a prescribed sizing amount and thereby generating an offset figure bounded by the imaginary straight lines, and for storing a set of offset vertices included in the offset figure as a second vertex set; an offset locus line segment generating step for generating an offset locus line segment by joining each vertex of the difference figure to one of the offset vertices that corresponds to the vertex; an intersection point detecting step for detecting the presence or absence of a first intersection point at which two offset locus line segments extending from adjacent vertices of the difference figure intersect each other; a sorting step for sorting the first intersection point in order of increasing distance, based on the distance between the first intersection point and the side of the difference figure which is associated with the two offset locus line segments intersecting at the first intersection point; and a vertex revising step for computing a second intersection point which defines an intersection between two offset figure sides that extend from the offset vertices of the two offset locus line segments intersecting at the first intersection point selected by sorting, deleting the offset vertices associated with the selected first intersection point from the second vertex set, storing the second intersection point as a new vertex in the second vertex set, deleting from the first vertex set the vertices of the difference figure that are connected to the two offset locus line segments, and storing the selected first intersection point as a new vertex of the difference figure in the first vertex set.

The geometric figures described above are each generated by applying a different processing system.

In the vertex updating step, when the two offset figure sides are parallel to each other, and when the second intersection point does not exist, a second imaginary straight line passing through the first intersection point and parallel to the two offset figure sides is generated, third intersection points are found each defining a point at which the second imaginary straight line intersects one of two offset locus line segments extending from the offset vertices located at ends of the offset figure sides associated with the first intersection point, and of the third intersection points thus found, the third intersection point nearer to the first intersection point is selected, while of the parallel offset figure sides, the offset vertex associated with the offset figure side connected to the offset locus line segment containing the selected third intersection point and the offset vertices of the offset figure side associated with the first intersection point are deleted from the second vertex set, an intersection point is found at which the offset figure sides extending from the deleted offset vertices intersect each other, and the intersection point is stored in the second vertex set as a new vertex in place of the deleted vertices.

Another computer readable storage medium according to the present invention stores thereon a reduction processing program for causing a computer to execute program steps wherein reduction processing is applied to a difference figure generated by overlaying two geometric figures, to verify based on the size of the difference figure the validity of processing applied to each of the geometric figures, the program steps comprising: a first vertex set storing step for storing a set of vertices included in the difference figure as a first vertex set; an offset figure generating step for translating an imaginary straight line from each side of the difference figure inwardly of the figure by a distance equal to a prescribed sizing amount and thereby generating an offset figure bounded by the imaginary straight lines, and for storing a set of offset vertices included in the offset figure as a second vertex set; an offset locus line segment generating step for generating an offset locus line segment by joining each vertex of the difference figure to one of the offset vertices that corresponds to the vertex; an intersection point detecting step for detecting the presence or absence of a first intersection point at which two offset locus line segments extending from adjacent vertices of the difference figure intersect each other; a sorting step for sorting the first intersection point in order of increasing distance, based on the distance between the first intersection point and the side of the difference figure which is associated with the two offset locus line segments intersecting at the first intersection point; and a vertex revising step for computing a second intersection point which defines an intersection between two offset figure sides that extend from the offset vertices of the two offset locus line segments intersecting at the first intersection point selected by sorting, deleting the offset vertices associated with the selected first intersection point from the second vertex set, storing the second intersection point as a new vertex in the second vertex set, deleting from the first vertex set the vertices of the difference figure that are connected to the two offset locus line segments, and storing the selected first intersection point as a new vertex of the difference figure in the first vertex set.

In the vertex revising step, when the two offset figure sides are parallel to each other, and when the second intersection point does not exist, a second imaginary straight line passing through the first intersection point and parallel to the two offset figure sides is generated, third intersection points are found each defining a point at which the second imaginary straight line intersects one of two offset locus line segments extending from the offset vertices located at ends of the offset figure sides associated with the first intersection point, and of the third intersection points thus found, the third intersection point nearer to the first intersection point is selected while, of the parallel offset figure sides, the offset vertex associated with the offset figure side connected to the offset locus line segment containing the selected third intersection point and the offset vertices of the offset figure side associated with the first intersection point are deleted from the second vertex set, an intersection point is found at which the offset figure sides extending from the deleted offset vertices intersect each other, and the intersection point is stored in the second vertex set as a new vertex in place of the deleted vertices.

According to the present invention described above, since the inside-out side elimination processing is applied only to the neighborhood of each inside-out side in the order of occurrence of the inside-out side, the computational order for the offset step in the reduction process is $$O(N+M \log M)$$

where $0 \leq M \leq N$

On the other hand, the computational order for the OR operation is $$O((N-M)\log(N-M))$$

where N is the number of vertices of the source figure, and M is the number of inside-out sides.

The sum of the computational orders is smaller than the computational order for the first sizing processing method explained in the description of the prior art, and besides, calculation errors such as those involved in the second sizing processing method do not arise because the offset is performed in a single operation.

BRIEF DESCRIPTION OF THE DRAWINGS

FIGS. 1A and 1B are a flowchart for explaining the offset processing performed in a reduction processing method according to the present invention.

FIG. 7A is a verification operation flow for an entire optical proximity correction process according to the prior art.

FIG. 10 is an explanatory diagram showing another example of a source figure in which, depending on the sizing amount, an inside-out side occurs and reduction cannot be done properly.

FIG. 12 is an explanatory diagram showing another example of a source figure in which, depending on the sizing amount, an inside-out side occurs and reduction cannot be done properly.

DESCRIPTION OF THE PREFERRED EMBODIMENT

Before describing the embodiments of the present invention, the related art and the disadvantages therein will be described with reference to the related figures.

Figure 7B:
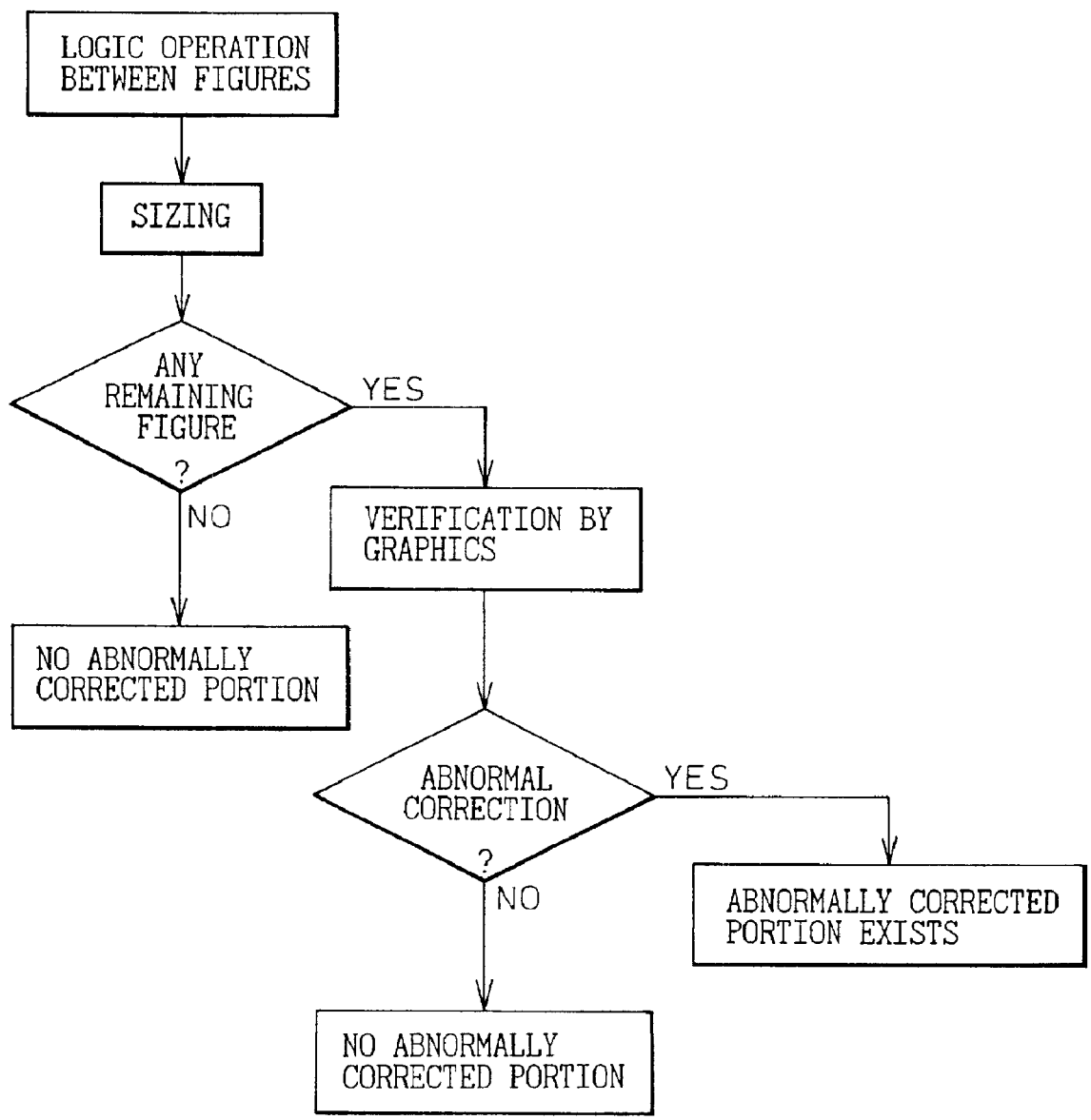
FIG. 7B is an operation flow for an abnormally corrected portion detection process using a prior art reduction processing method.

In a first geometrical verification method practiced in the art to verify the validity of geometrical data generated by geometrical processing, first a difference figure is obtained by overlaying a source geometric figure (design data) on a new geometric figure generated by applying a geometrical processing operation (for example, optical proximity correction) to the source figure, and by XORing the two geometric figures, as shown in FIGS. 7A and 7B. Then, verification is made based on the size of the difference figure; that is, if the difference figure is large, it is determined that a problem has occurred in the geometrical processing and there is an error in the new figure generated by the geometrical processing. On the other hand, if the difference figure is smaller than a specified value, then it is determined that no problem has occurred in the geometrical processing and, therefore, there is no error in the new figure generated by the geometrical processing, that is, the new figure is judged to be normal.

Figure 8:
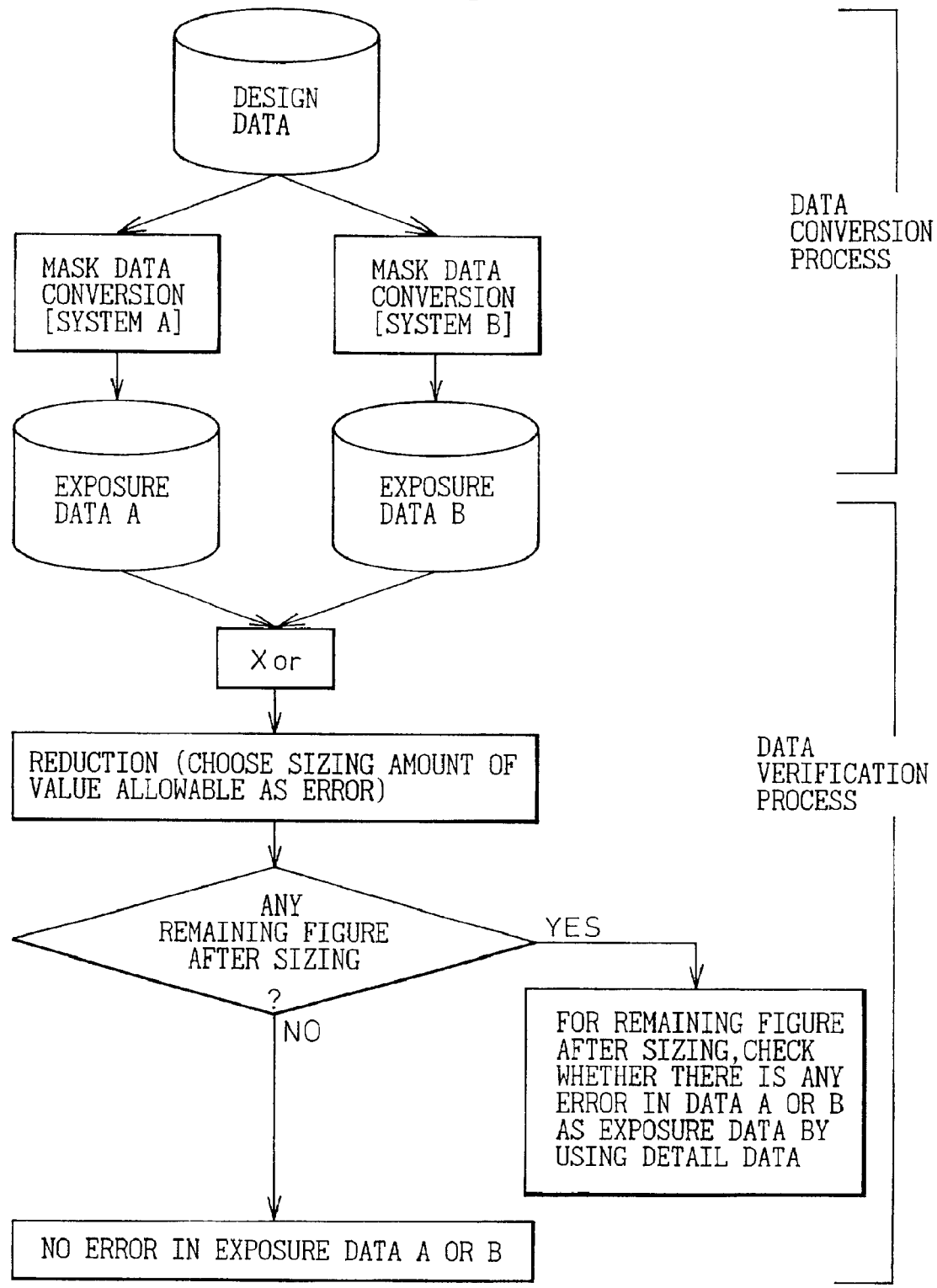
FIG. 8 is a verification operation flow for a mask data conversion process according to the prior art.

On the other hand, in a second verification method, as shown in FIG. 8, different processing systems using different algorithms or procedures, though the purpose of processing is the same, are applied to the source geometric figure and, as is done in the first verification method, a difference figure between the two new geometric figures generated by the respective systems is obtained; then, verification is done based on the size of the difference figure, and if the difference figure is large, it is determined that there is a problem in one or the other of the geometrical processing systems, that is, there is an error in one of the new figures. On the other hand, if the difference figure is smaller than a specified value, both of the new figures are judged to be normal.

As a means for judging the size of the difference figure, generally a reduction technique is employed. That is, after reduction with a suitable sizing amount is applied to the difference figure, if the difference figure disappears, it is determined that the difference figure is small; otherwise, it is determined that the difference figure is large.

Figure 9:
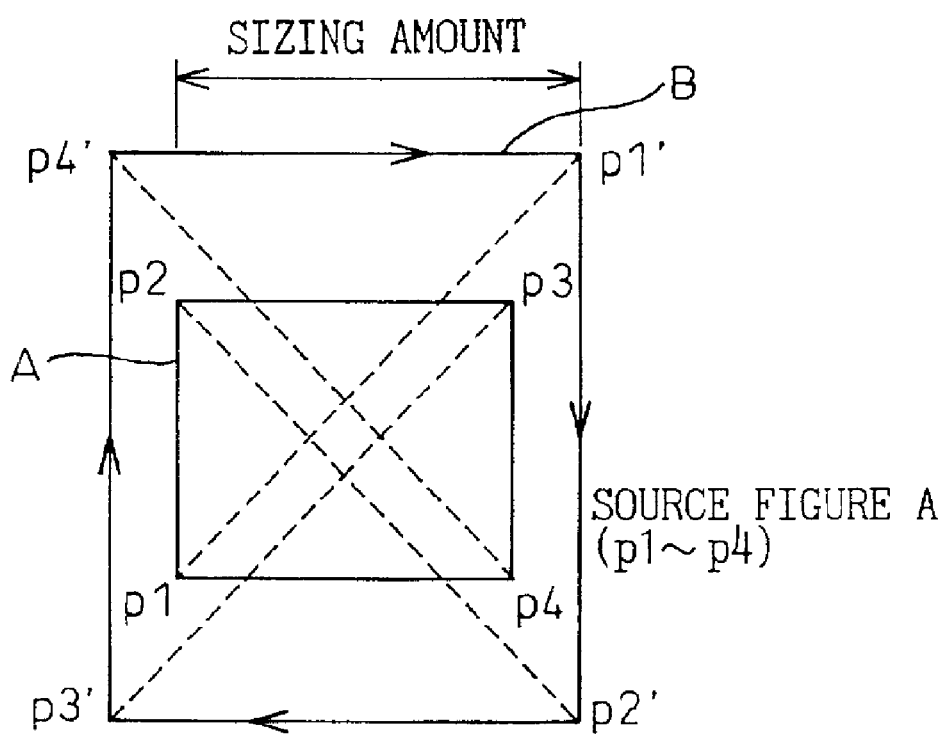
FIG. 9 is an explanatory diagram showing one example of a source figure in which, depending on the sizing amount, an inside-out side occurs and reduction cannot be done properly.

However, in the case of the source figure A of the shape shown in FIG. 9 or 10 (in the case of FIG. 9, the figure formed by vertices p1, p2, p3, and p4), the sizing amount is larger than the source figure A, and the source figure A should therefore disappear as the result of the processing, but in actuality there occurs the phenomenon that the source figure A does not disappear because of the existence of an inside-out side even when an OR operation is applied to a tentative offset figure B (in the case of FIG. 9, the figure formed by vertices p1', p2', p3', and p4') after the offset operation.

To address this situation, the first sizing processing method or the second sizing processing method hereinafter described has been practiced in the art as a processing method that solves the problem caused by the inside-out side.

Figure 11A:
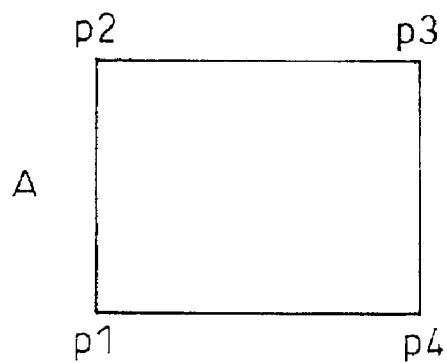
FIG. 11A is a diagram showing a source figure in one example of a prior art offset processing method that can accomplish reduction properly.
Figure 11B:
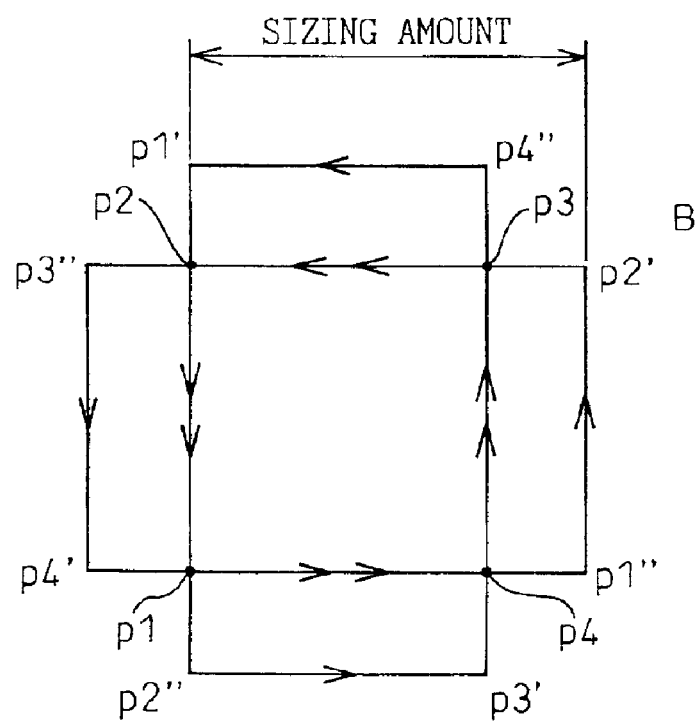
FIG. 11B is a diagram showing an offset figure obtained by applying an offset operation to the source figure shown in FIG. 11A.

In the first sizing processing method, as shown in FIG. 11B, offset points (p1', p1", p2', p2", p3', p3", and p4', p4") are generated for the respective vertices (p1, p2, p3, and p4) of the source figure A shown in FIG. 11A. For example, when the vertex p1 is one at a convex point of the figure, the point corresponding to the vertex p1 after the side (p1, p2) has been translated by a distance equal to the sizing amount and the point corresponding to the vertex p1 after the side (p4, p1) has been translated by the same distance are the offset points for the vertex p1. Though not shown here, when the vertex p1 is one at a concave point of the figure, the point of intersection between an imaginary straight line translated from the side (p1, p2) by a distance equal to the sizing amount and an imaginary straight line translated from the side (p4, p1) by the same distance is the offset point for the vertex p1.

Figure 13A:
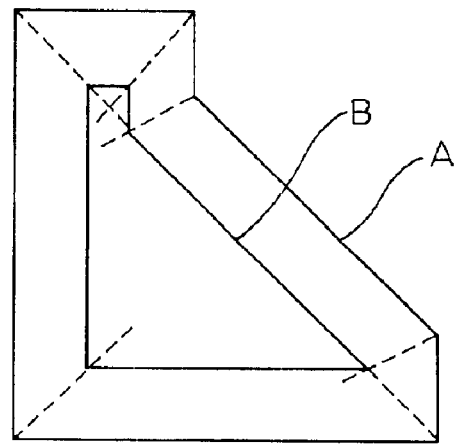
FIG. 13A is a diagram for explaining, using the source figure of FIG. 12, another example of a prior art offset processing method that can accomplish reduction properly, the diagram showing the condition in which the reduction has been performed until the first inside-out side occurs.
Figure 13B:
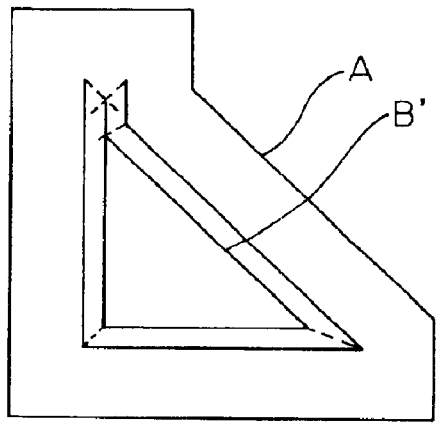
FIG. 13B is a diagram showing the condition in which, after the occurrence of the first inside-out side in FIG. 13A, the reduction has progressed until a second inside-out side occurs.
Figure 13C:
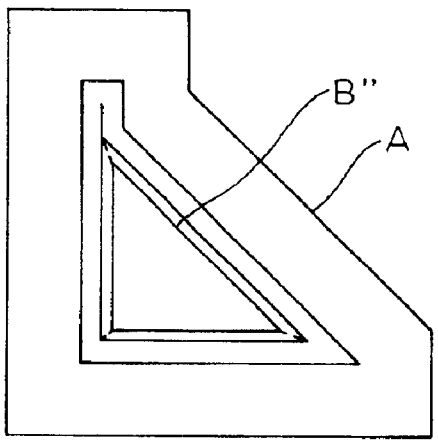
FIG. 13C is a diagram showing the condition in which the remainder of the reduction processing has been performed from the condition of FIG. 13B.

In the second sizing processing method, each side of the source figure A having the vertices (p1, p2, p3, p4, p5, and p6) is offset at once. As a result, an offset figure B formed by the offset points (p1', p2', p3', p4', p5', and p6') is generated as shown in FIG. 12. The generated offset figure B contains inside-out sides (p2', p3') and (p5', p6'). Accordingly, as shown in FIGS. 13A to 13C, an offset operation with a small sizing amount is applied to each side of the source figure A repetitively in small increments until a final offset figure B" is obtained.

However, in the first sizing processing method, it takes a long time for OR operations since two new vertices are generated for each vertex of the source figure.

More specifically, the computational orders required for the offset and OR operations are as follows.

Offset operation: O(N)

OR operation: O((aN)log(aN))

Here, log is a logarithm to the base 2. N represents the number of vertices of the source figure. Further, a indicates the rate of increase of the number of input vertices to the OR operation, and the number of input vertices to the OR operation is given by aN. Here, $2 \leq a$. In the reduction process, when one half or more of the vertices of the source figure A are convex vertices, the number of vertices, after the offset, increases by a factor of 3 for the convex vertices and 1 for the concave vertices.

In the second sizing processing method, since offset figures are obtained in a stepwise manner using small incremental sizing amounts, calculation errors contained in the vertices of the final offset figure, that is, the offset points, increase.

In view of the above, in the embodiment of the present invention for solving the above problems, inside-out side elimination processing is applied to each inside-out side in the order of occurrence of the inside-out side in the offset figure. This provides a reduction processing method that can reduce the amount of computation, is fast, and is capable of performing precise sizing.

The preferred embodiment of the reduction processing method according to the present invention will be described in detail below with reference to the accompanying drawings.

The source figure (difference figure) A formed by the vertices (p1, p2, p3, p4, p5, and p6), shown in FIG. 12, will be taken as an example. A procedure for applying reduction to this source figure A will be described with reference to the flowchart of FIGS. 1A and 1B and the geometric figures shown in FIGS. 2 to 6. For convenience of explanation, the set of vertices (p1, p2, p3, p4, p5, and p6) of the source figure A will be referred to as the first vertex set. This first vertex set is prestored in memory. The source figure A is a geometric figure having such a shape that when the offset processing is performed by applying a sizing amount large enough to make the source figure A disappear, inside-out sides occur in the generated offset figure B.

First, an imaginary straight line is generated from each side of the source figure A by translating it inwardly of the source figure A by a distance equal to the sizing amount (offset amount). Then, offset points, i.e., the intersection points of the respective imaginary straight lines generated corresponding to the respective sides, are found, and these points are stored in memory. Here, vertices p1', p2', p3', p4', p5', and p6' are generated as the offset points for the vertices p1, p2, p3, p4, p5, and p6 of the source figure A.

An offset figure is formed by the thus offset imaginary straight lines, more specifically, by the line segment (p1', p2') joining the vertices p1' and p2', the line segment (p2', p3') joining the vertices p2' and p3', the line segment (p4', p5') joining the vertices p4' and p5', the line segment (p5', p6') joining the vertices p5' and p6', and the line segment (p6', p1') joining the vertices p6' and p1'.

Figure 2:
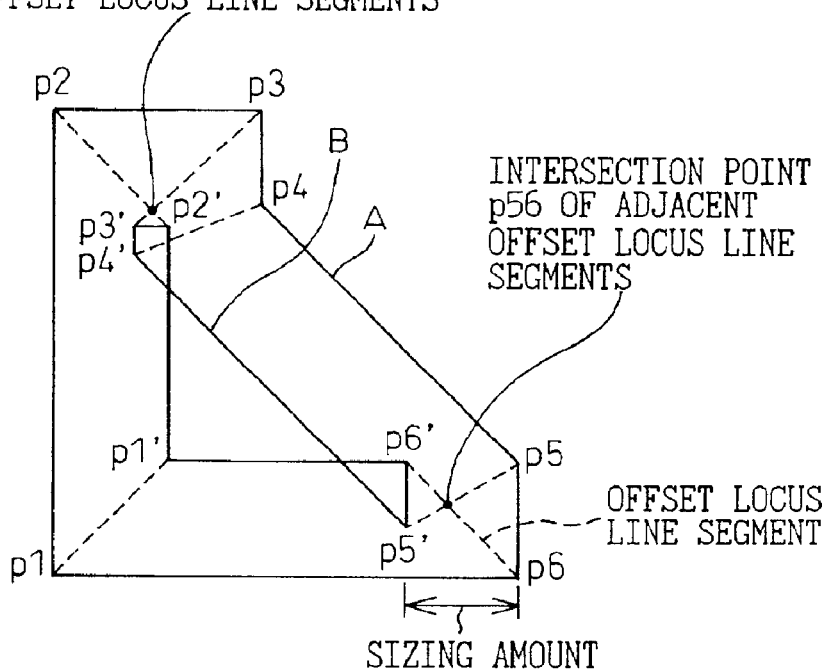
FIG. 2 is an explanatory diagram showing a source figure and an offset figure generated from it.

The offset figure B formed by these line segments is shown in FIG. 2. For convenience of explanation, the set of offset points (p1', p2', p3', p4', p5', and p6') defining the vertices of the offset figure B will be referred to as the second vertex set (step S100: Offset figure generating step).

Figure 3:
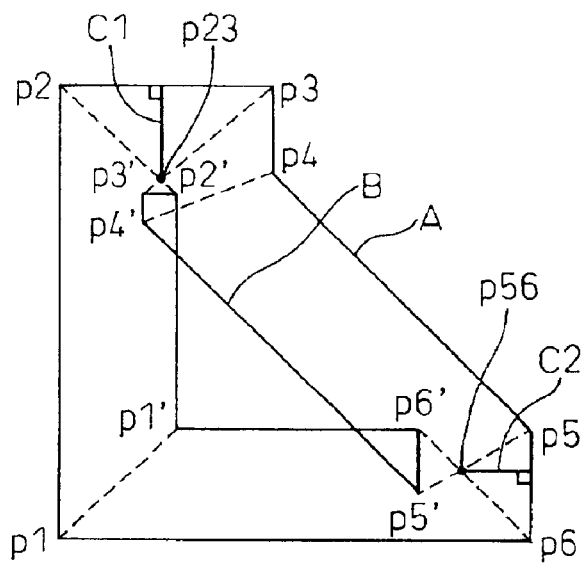
FIG. 3 is an explanatory diagram illustrating the detection of inside-out sides, that is, first intersection points where offset locus lines intersect.

Next, offset locus line segments joining the vertices (p1, p2, p3, p4, p5, and p6) of the source figure A to their corresponding vertices (p1', p2', p3', p4', p5', and p6') of the offset figure B are generated as shown in FIG. 3 (Offset locus line segment generating step).

The offset locus line segments consist of the line segment (p1, p1') joining the vertices p1 and p1', the line segment (p2, p2') joining the vertices p2 and p2', the line segment (p3, p3') joining the vertices p3 and p3', the line segment (p4, p4') joining the vertices p4 and p4', the line segment (p5, p5') joining the vertices p5 and p5', and the line segment (p6, p6') joining the vertices p6 and p6'.

The point where the offset locus line segments extending from any two vertices of the source figure A to their corresponding vertices of the offset figure B intersect each other will be referred to as the first intersection point. A plurality of such intersection points can occur depending on the shape of the source figure. The presence or absence of such a first intersection point is detected. In FIG. 3, since the offset locus line segment (p2, p2') intersects the offset locus line segment (p3, p3'), and the offset locus line segment (p5, p5') intersects the offset locus line segment (p6, p6'), there are two first intersection points p23 and p56, which are respectively detected. At the same time, inside-out sides (p2', p3') and (p5', p6') are also detected (Inside-out detecting step).

Step S102 in the flowchart shown in FIG. 1 includes the offset locus line generating step and inside-out detecting step described above.

Next, distance C is obtained between the first intersection point and the side of the source figure A whose ends are connected to the two offset locus line segments intersecting at the first intersection point. In the example of FIG. 3, the distance C1 between the first intersection point p23 and the side (p2, p3) and the distance C2 between the first intersection point p56 and the side (p5, p6) are obtained. These distances are sorted in order of increasing distance (Step S104: Sorting step).

Since the detection of a first intersection point indicates the presence of an inside-out side, the sorting step carried out based on the distance between each first intersection point and its associated side also involves sorting the inside-out sides associated with the respective first intersection points. In FIG. 3, since distance C1>distance C2, the inside-out sides are sorted in the order of the first intersection points p56 and p23.

Next, based on the thus sorted order, one first intersection point is designated, and processing is performed to eliminate the inside-out side associated with the designated first intersection point. The inside-out side elimination processing is performed each time a further first intersection point occurs in the geometric figure generated as the result of the inside-out side elimination, and this elimination processing is repeated until no further first intersection point occurs.

The sequence of this processing will be described in detail below.

First, the inside-out side (p5', p6') of the offset figure B, whose ends are connected to the two offset locus line segments (p5, p5') and (p6, p6') intersecting at the first intersection point p56, the first of the sorted first intersection points, is obtained. Then, adjoining sides (p4', p5') and (p6', p1') connected to the respective ends of the inside-out side (p5', p6') are selected from the offset figure B, and the point where the adjoining sides intersect is found. This intersection point is called the second intersection point. The second intersection point p56' is computed as shown in FIG. 4.

Next, the two vertices p5 and p6 of the source figure A, from which are extended the two offset locus line segments intersecting at the designated first intersection point p56, are deleted from the first vertex set, and further, the two vertices p5' and p6' of the offset figure B, at which the two offset locus line segments terminate, are deleted from the second vertex set.

Then, the designated first intersection point p56 is added as a new vertex to the first vertex set for the source figure A, and is stored in memory. Likewise, the second intersection point p56' is added to the second vertex set as a new vertex of the offset figure B corresponding to the new vertex p56 of the source figure A, and is stored in memory. This completes the elimination of the inside-out side (p5', p6') associated with the designated first intersection point p56 (step S106: Vertex revising step).

Figure 4:
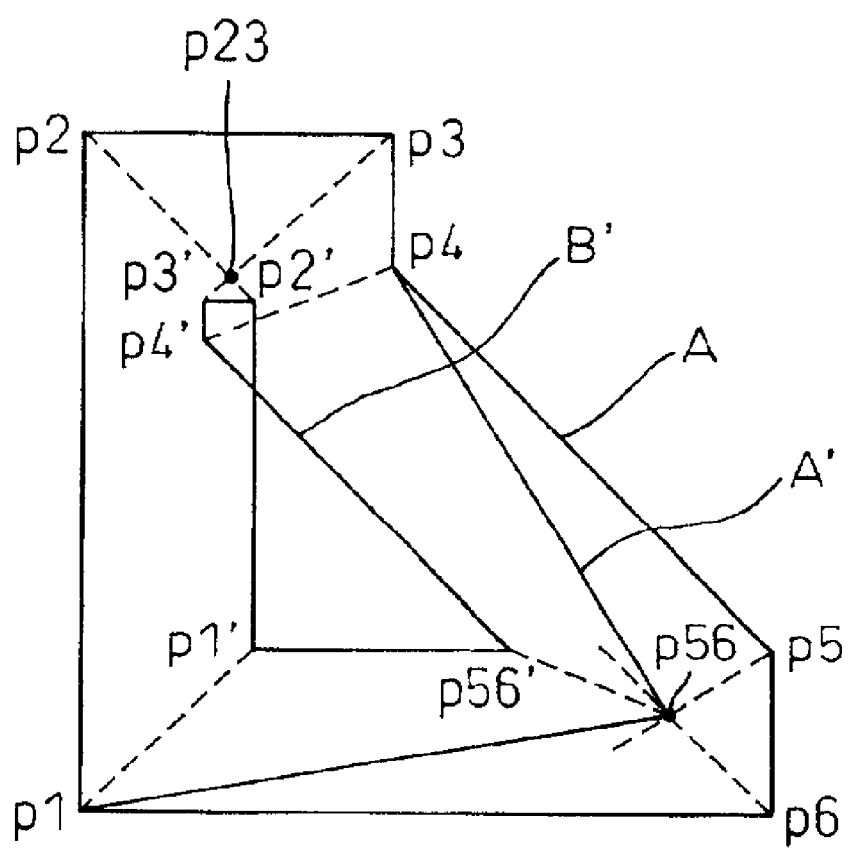
FIG. 4 is an explanatory diagram illustrating the elimination of the inside-out side associated with the first of the first intersection points.

The result is shown in FIG. 4. The first vertex set is (p1, p2, p3, p4, and p56), the second vertex set is (p1', p2', p3', p4', and p56'), and the inside-out sides (p5, p6) and (p5', p6') are eliminated, thus revising the respective vertex sets.

Next, between the source figure A' and offset figure B' formed by the revised vertex sets, the corresponding vertices are joined and, based on the offset locus line segments including the newly generated offset locus line segment (p56, p56'), the presence or absence of a first intersection point where any two offset locus line segments intersect, that is, the presence or absence of an inside-out side, is detected (step S108: Second inside-out side detecting step).

Then, the entire figure is re-sorted and, if the presence of a first intersection point is detected, the inside-out side associated with the newly detected first intersection point is added to the already sorted inside-out side list (step S110: Re-sorting step). The process then returns to step S106 where processing is performed to eliminate the inside-out side associated with the first intersection point carried at the top of the re-sorted list.

If, in step S108, no first intersection point is detected between the source figure A' and offset figure B', the process skips step S110, and the repetitive processing is terminated.

In the present embodiment, since the newly generated offset locus line segment (p56, p56') does not intersect any other offset locus line segment, as shown in FIG. 4, a new first intersection point is not generated. However, as a result of the above re-sorting, the first intersection point p23 is now detected as the first intersection point at the top of the list. The inside-out side associated with the first intersection point exists. Therefore, the inside-out elimination processing is performed on the first intersection point p23 by following the same procedure performed for the first intersection point p56.

Here, attention is paid to the two offset locus line segments (p2, p2') and (p3, p3') intersecting at the first intersection point p23. The inside-out side (p2', p3') of the offset figure B' is located where these offset locus line segments terminate. The intersection point between the two adjoining sides (p1', p2') and (p3', p4') of the offset figure B' connected to the respective ends of the inside-out side is found. This intersection point is defined as the second intersection point.

However, in the example of FIG. 4, since the sides (p1, p2) and (p3, p4) of the source figure A are parallel to each other, the corresponding sides (p1', p2') and (p3', p4') of the offset figure B' are also parallel to each other, so that the second intersection point does not exist. This means that the inside-out side cannot be eliminated when it does exist.

In such a case, to eliminate the inside-out side (p2', p3') of the offset figure B', the inside-out side as the processing target is modified.

An inside-out revising step is performed to modify the inside-out side. First, either one of the two adjoining sides (p1', p2') and (p3', p4') connected to the respective ends of the inside-out side (p2', p3') is incorporated as a part of the inside-out side. Then, based on this updated inside-out side, the second intersection point is determined.

The inside-out side revising step will be described in detail below.

Figure 5:
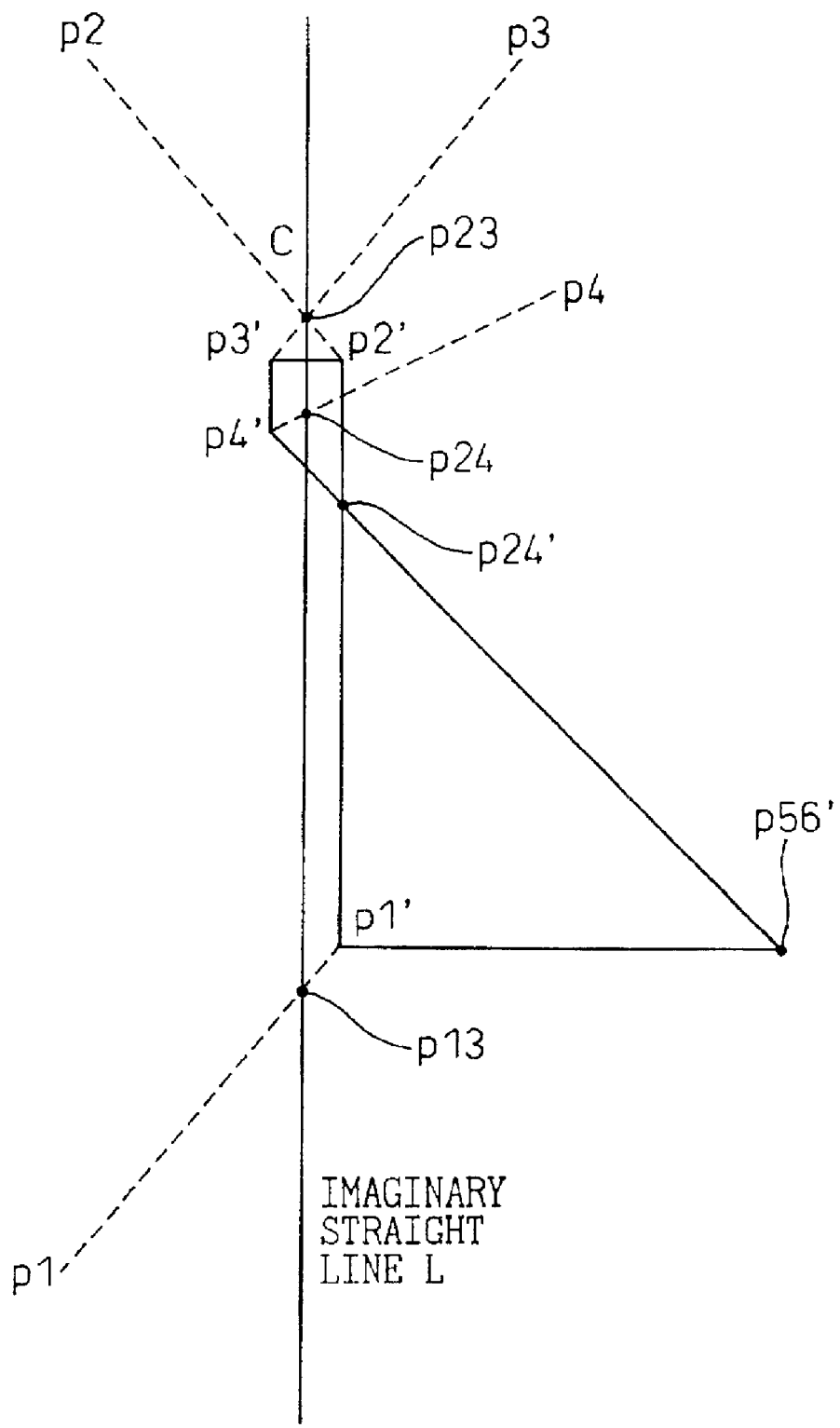
FIG. 5 is a diagram for explaining how the inside-out side associated with the second of the first intersection points is eliminated when its adjoining sides are parallel to each other.

First, a second imaginary straight line L passing through the first intersection point p23 and parallel to the respective adjoining sides (p1', p2') and (p3', p4') is generated as shown in FIG. 5.

Here, an intersection point p13, at which the second imaginary straight line L intersects the offset locus line segment (p1, p1') extending from the vertex p1'at one end of the side (p1', p2'), is found. Further, an intersection point p24, at which the second imaginary straight line L intersects the offset locus line segment (p4, p4') extending from the vertex p4' at one end of the side (p3', p4'), is found. These intersection points will be referred to as the third intersection points.

Then, of the offset locus line segments (p1, p1') and (p4, p4') passing through the respective third intersection points, the offset locus line segment passing through the third intersection point nearer to the first intersection point p23 is selected. In the example of FIG. 5, since the third intersection point p24 satisfies this condition, the offset locus line segment (p4, p4') containing the third intersection point p24 is selected, and the adjoining side (p3', p4') is incorporated into the inside-out side. The thus determined adjoining side (p3', p4') is combined with the inside-out side (p2', p3') to form a new inside-out side. More specifically, the side (p2', p3', p4') is the new inside-out side. Then, the processing steps from the step S106 onward are performed on the side (p2', p3', p4').

The inside-out side elimination processing for the side (p2', p3', p4') is similar to the processing starting from step S106 shown in FIG. 1B. The sequence of the processing will be described briefly below.

First, the second intersection point p24', at which the two adjoining sides (p1', p2') and (p4', p56') of the offset figure B' connected to the respective ends of the inside-out side (p2', p3', p4') of the offset figure B' intersect each other, is found.

Next, the vertices p2', p3', and p4' associated with the inside-out side (p2', p3', p4') of the offset figure B' are deleted from the second vertex set, and likewise, the vertices p2, p3, and p4 of the source figure A', to which are connected the offset locus line segments (p2, p2'), (p3, p3'), and (p4, p4') whose other ends are connected to the respective vertices of the inside-out side (p2', p3', p4'), are deleted from the first vertex set.

Then, the previously obtained third intersection point p24 is added to the first vertex set as a new vertex of the source figure A'', and stored in memory. Likewise, the second intersection point p24' is added to the second vertex set as a new vertex of the offset figure B', and stored in memory.

Figure 6:
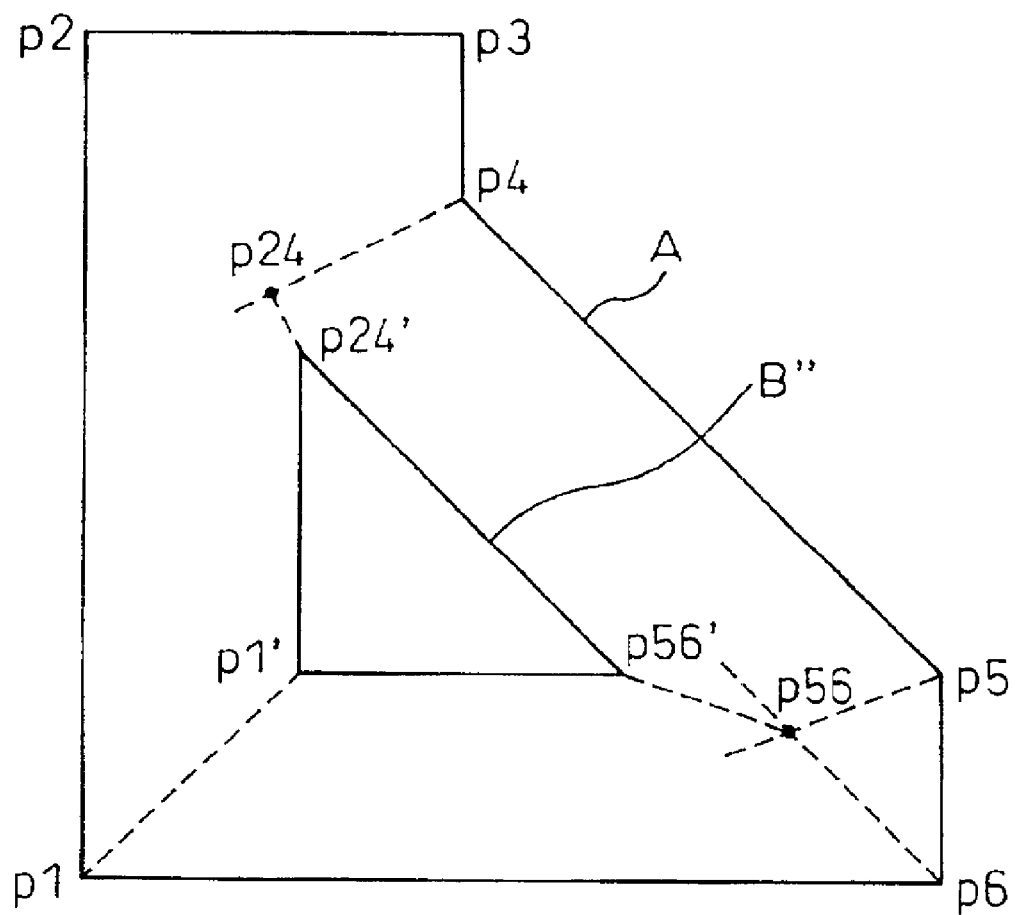
FIG. 6 is an explanatory diagram showing the source figure and the offset figure after all the inside-out sides have been eliminated.

With the above processing, the first vertex set associated with the source figure A is now defined as (p1, p24, p56), and the second vertex set associated with the offset figure B as (p1', p24', p56'), as shown in FIG. 6.

In this condition, the offset locus line segments (p1, p1'), (p24, p24'), and (p56, p56') do not intersect each other, which indicates that there is no inside-out side. Therefore, the offset processing is terminated at this point.

If, in step S102, no first intersection point is detected between any two offset locus line segments, the inside-out side elimination processing need not be performed because there is no inside-out side. Accordingly, the process skips the steps S104 to S110, and the offset processing is terminated.

Then, the reduction processing is terminated after performing an OR operation, as in the prior art example, on the offset figure B" of FIG. 6 to which the inside-out side elimination processing has been applied.

Figure 1A:
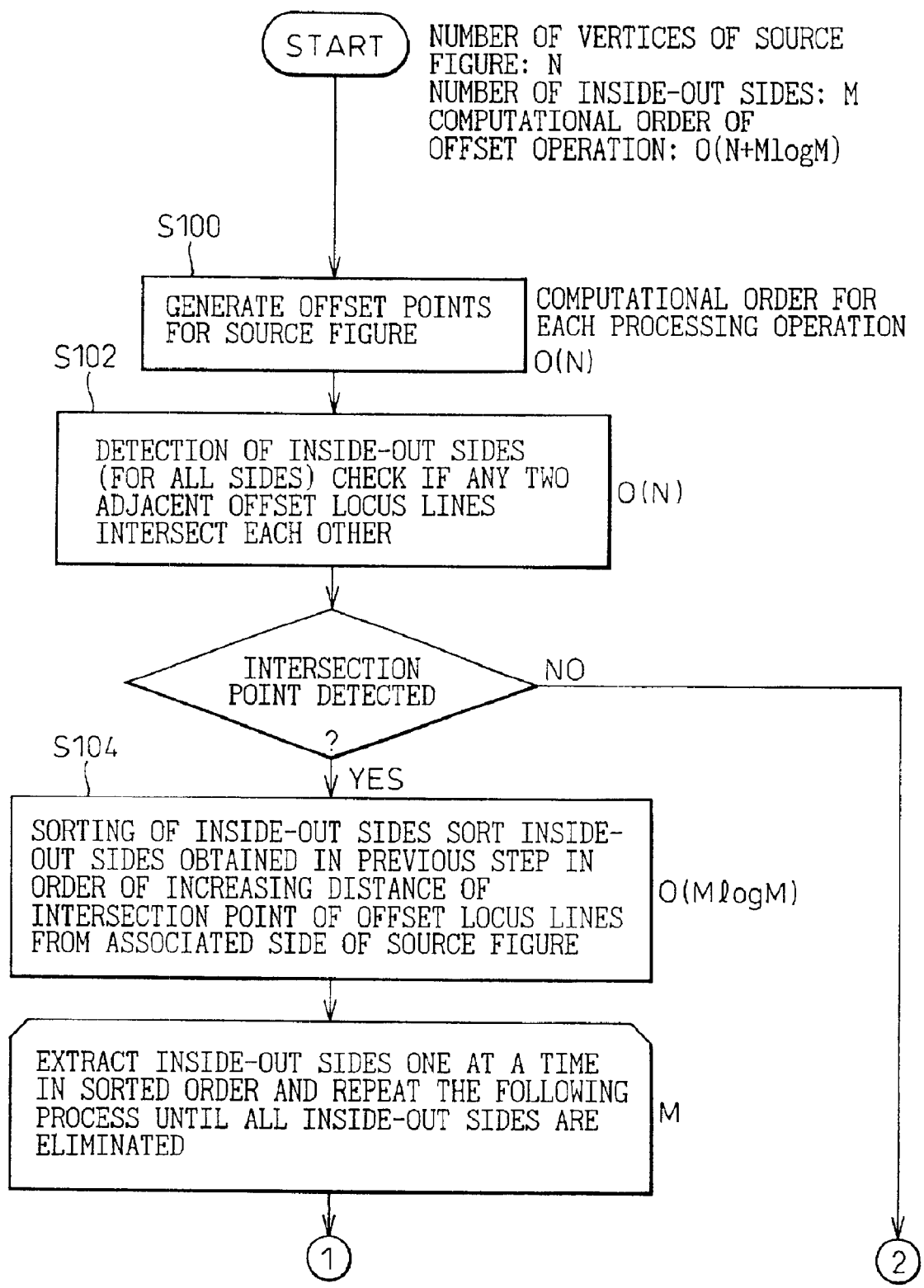

The computational order for the entire process of the reduction processing method of the prior art example shown in FIGS. 11A and 11B is compared with the computational order for the entire process of the reduction processing method of the present embodiment shown in FIGS. 1A and 1B.

The computational order for each of the steps shown in FIGS. 1A and 1B is obtained as follows.

Step S100 . . . O(N)
Step S102 . . . O(N)
Step S104 . . . O(M log M)
Step S106 . . . O(M)
Step S108 . . . O(M)
Step S110 . . . O(M log M)

From the above, the computational order for the entire offset operation is $$O(N+M \log M)$$

On the other hand, the computational order for the entire process of the reduction processing method of the prior art example shown in FIGS. 11A and 11B is, as previously given, $$O(N+aN \log aN) \qquad \text{expression (1)}$$

where $2 \leq a$.

The computational order for the reduction processing method of the present embodiment is Offset operation: $O(N+M \log M)$ OR operation: $O((N-M)\log(N-M)$ where $0 \leq M < N$ Therefore, the computational order for the entire reduction processing is given as $$O(N+M \log M+(N-M)\log(N-M))$$

Arranging this, we have $$O(N+M \log(M/N-M)+N \log(N-M)) \qquad \text{expression (2)}$$

Next, the second term of the expression (1) and the second and third terms of the expression (2) are compared for the following three cases.

a) N−M>M, i.e., M<N/2
The second term of the expression (2) is a negative value, so that expression (2)<expression (1) holds.

b) N−M=M, i.e., M=N/2
The second term of the expression (2) is zero, so that expression (2)<expression (1) holds.

c) N−M<M, i.e., M>N/2
The second term of the expression (2) is smaller than N log N because $0 \leq M \leq N$.

When the second term of the expression (2) is replaced by N log N, the sum of the second and third terms of the expression (2) is given as $$H \log N+N \log(N-M)$$

Arranging this, we have $$N(\log N(N-M)) \qquad \text{expression (3)}$$

From the condition M>N/2, the following relation holds.

$$N(\log N(N-M))<2N(\log(N/\sqrt{2})) \qquad \text{expression (4)}$$

The right hand side of the expression (4) is smaller in value than the second term of the expression (1). Hence, expression (2)<expression (1).

As described above, expression (2)<expression (1) holds for all the cases, which means that the computational order of the present invention is smaller than the computational order of the prior art example explained with reference to FIGS. 11A and 11B. Accordingly, the present invention can reduce the amount of computation required for the reduction processing, and thus achieve a higher processing speed.

Furthermore, since each side of the source figure A is offset in a single operation, errors contained in the offset points do not increase, unlike the case of the processing method of the prior art example shown in FIGS. 13A to 13C.

Figure 14:
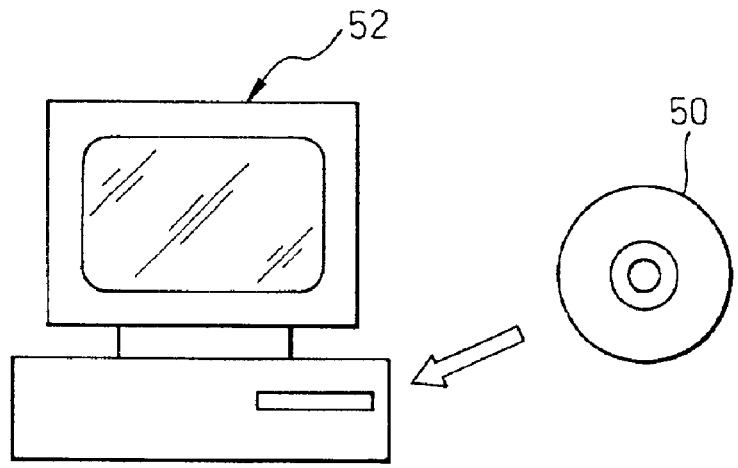
FIG. 14 is an explanatory diagram showing an external view of a sizing processing apparatus and an external view of a storage medium having a sizing processing program stored thereon for implementing a sizing processing method.

As shown in FIG. 14, a program for executing the above-described sizing processing method is stored on a storage medium (an external storage medium such as a floppy disk or a CD-ROM) 50. In one example, the program is installed on a computer 52 having the configuration described below, and the computer 52 operates as a sizing processing apparatus in a CAD machine or the like.

Figure 15:
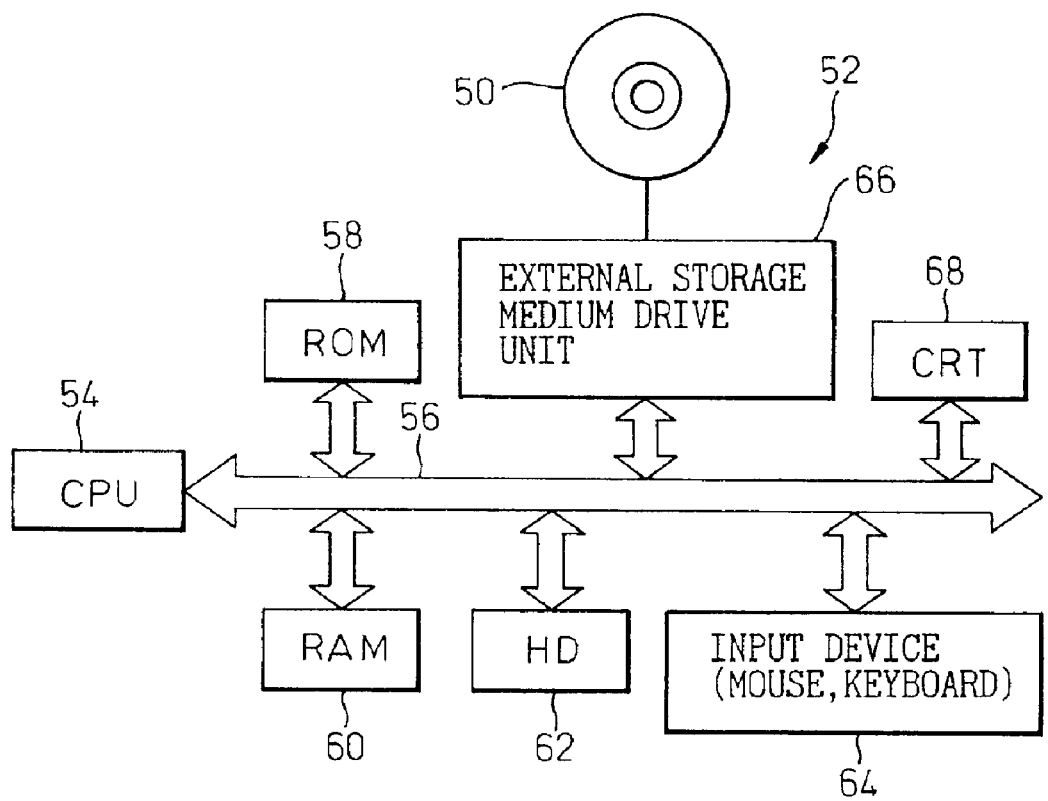
FIG. 15 is a diagram showing the configuration of the sizing processing apparatus of FIG. 14.

The configuration of the computer 52 that operates as the sizing processing apparatus will be briefly described below with reference to FIG. 15.

A CPU 54 is responsible for the entire control of the sizing processing apparatus 52. A ROM 58, a RAM 60, an HD (hard disk drive) 62, an input device 64 such as a mouse and a keyboard, an external storage medium drive unit 66, and a display unit 68 such as a CRT are connected to the CPU 54 via a bus 56.

The control program for the CPU 54 is stored in the ROM 58. The sizing processing program for causing the computer to execute the sizing processing method is installed from the storage medium 50 onto the HD 62. The RAM 60 provides an area where part of the sizing processing program is stored for execution of the program, and a work area that the CPU 54 uses to execute the sizing processing program. Input data, final data, an OS (operating system), etc. are prestored on the HD 62.

First, when power is turned on to the computer 52, the CPU 54 reads the control program from the ROM 58, and also the OS from the HD 62. The OS is activated. The computer 52 is thus set ready for the installation of the sizing processing program from the storage medium 50.

Next, the storage medium 50 is loaded into the external storage medium drive unit 66. A control command is input to the CPU 54 from the input device 64, and the sizing processing program stored on the storage medium 50 is read out and stored on the HD 62. That is, the sizing processing program is installed on the computer 52.

Thereafter, when the sizing processing program is activated, the computer 52 operates as a sizing processing apparatus. The operator can perform the sizing processing described above, by operating the input device 64 for specific tasks and procedures interactively in accordance with the instruction given by the sizing processing program and displayed on the CRT 68.

According to the reduction processing method and the computer readable storage medium having a program stored thereon for causing a computer to perform the reduction processing of the present invention, since the inside-out side elimination processing is performed only on detected inside-out sides in the order of occurrence of the inside-out sides, the computational order of each processing step in the reduction processing is relatively small, and therefore, the processing time can be reduced.

Furthermore, since the source figure is offset at once, the invention offers the effect of eliminating the possibility of calculation errors which has been the problem with the method that performs the inside-out side elimination processing by offsetting each side of the source figure.

What is claimed is:

1. A computer-implemented reduction processing method comprising:

an offset figure generating step for generating, based on a geometric figure having a plurality of vertices, an offset figure by translating sides, formed by joining said vertices, inwardly of said geometric figure by a distance equal to a prescribed sizing amount;

an offset locus line segment generating step for generating an offset locus line segment by joining each of said vertices to an offset vertex corresponding to said each vertex, said offset vertex being located on said offset figure;

an intersection point detecting step for detecting a first intersection point at which offset locus line segments associated with an adjacent pair of said vertices intersect each other; an offset vertex deleting step for deleting the offset vertices each located at one end of one of the offset locus line segments intersecting at said first intersection point; and an offset figure revising step for revising said offset figure by finding a second intersection point at which offset figure line segments, forming said offset figure by joining said offset vertices, intersect each other, and by setting said second intersection point as an offset vertex in place of said deleted offset vertices.

2. A computer-implemented reduction processing method as claimed in claim 1, wherein in said intersection point detecting step, said detected first intersection point is sorted in order of increasing distance from the side of said geometric figure which is associated with said first intersection point, and in said offset vertex deleting step, the offset vertices associated with said first intersection point are deleted in accordance with said sorted order.

3. A computer-implemented reduction processing method as claimed in claim 1 or 2, wherein in said intersection point detecting step, if two offset figure line segments extending from the respective offset vertices associated with said detected first intersection point are parallel to each other, an imaginary straight line passing through said first intersection point and extending parallel to said two offset figure line segments is drawn, third intersection points are found each defining a point at which an offset locus line segment associated with the offset vertex at an opposite end of one of said two offset figure line segments intersects said imaginary straight line and, of said third intersection points thus found, the third intersection point nearer to said first intersection point is selected, and in said offset vertex deleting step, the offset vertices associated with said sorted first intersection point and the offset vertex on the offset locus line segment associated with said selected third intersection point are deleted.

4. A computer readable storage medium having a reduction processing program stored thereon for causing a computer to execute program steps comprising:

an offset figure generating step for generating, based on a geometric figure having a plurality of vertices, an offset figure by translating sides, formed by joining said vertices, inwardly of said geometric figure by a distance equal to a prescribed sizing amount;

an offset locus line segment generating step for generating an offset locus line segment by joining each of said vertices to an offset vertex corresponding to said each vertex, said offset vertex being located on said offset figure;

an intersection point detecting step for detecting a first intersection point at which offset locus line segments associated with an adjacent pair of said vertices intersect each other;

an offset vertex deleting step for deleting the offset vertices each located at one end of one of the offset locus line segments intersecting at said first intersection point; and an offset figure revising step for revising said offset figure by finding a second intersection point at which offset figure line segments, forming said offset figure by joining said offset vertices, intersect each other, and by setting said second intersection point as an offset vertex in place of said deleted offset vertices.

5. A computer readable storage medium having a reduction processing program stored thereon for causing a computer to execute said program steps as claimed in claim 4, wherein in said intersection point detecting step, said detected first intersection point is sorted in order of increasing distance from the side of said geometric figure which is associate with said first intersection point, and in said offset vertex deleting step, the offset vertices associated with said first intersection point are deleted in accordance with said sorted order.

6. A computer readable storage medium having a reduction processing program stored thereon for causing a computer to execute said program steps as claimed in claim 4 or 5, wherein in said intersection point detecting step, if two offset figure line segments extending from the respective offset vertices associated with said detected first intersection point are parallel to each other, an imaginary straight line passing through said first intersection point and extending parallel to said two offset figure line segments is generated, third intersection points are found each defining a point at which an offset locus line segment associated with the offset vertex at an opposite end of one of said two offset figure line segments intersects said imaginary straight line, and of said third intersection points thus found, the third intersection point nearer to said first intersection point is selected, and in said offset vertex deleting step, the offset vertices associated with said sorted first intersection point and the offset vertex at said opposite end of said offset locus line segment associated with said selected third intersection point are deleted.

7. A computer-implemented reduction processing method which is applied to a difference figure generated by overlaying two geometric figures, to verify based on the size of said difference figure the validity of processing applied to each of said geometric figures, comprising:

a first vertex set storing step for storing a set of vertices included in said difference figure as a first vertex set;

an offset figure generating step for translating an imaginary straight line from each side of said difference figure inwardly of said figure by a distance equal to a prescribed sizing amount and thereby generating an offset figure bounded by said imaginary straight lines, and for storing a set of offset vertices included in said offset figure as a second vertex set;

an offset locus line segment generating step for generating an offset locus line segment by joining each vertex of said difference figure to one of said offset vertices that corresponds to said each vertex;

an intersection point detecting step for detecting the presence or absence of a first intersection point at which two offset locus line segments extending from adjacent vertices of said difference figure intersect each other;

a sorting step for sorting said first intersection point in order of increasing distance, based on the distance between said first intersection point and the side of said difference figure which is associated with said two offset locus line segments intersecting at said first intersection point; and a vertex revising step for computing a second intersection point which defines an intersection between two offset figure sides that extend from the offset vertices of said two offset locus line segments intersecting at said first intersection point selected by sorting, deleting said offset vertices associated with said selected first intersection point from said second vertex set, storing said second intersection point as a new vertex in said second vertex set, deleting from said first vertex set the vertices of said difference figure that are connected to said two offset locus line segments, and storing said selected first intersection point as a new vertex of said difference figure in said first vertex set.

8. A computer-implemented reduction processing method as claimed in claim 7, wherein said geometric figures are each generated by applying a different processing system.

9. A computer-implemented reduction processing method as claimed in claim 7, wherein in said vertex revising step
when said two offset figure sides are parallel to each other, and when said second intersection point does not exist,
a second imaginary straight line passing through said first intersection point and parallel to said two offset figure sides is generated, third intersection points are found each defining a point at which said second imaginary straight line intersects one of two offset locus line segments extending from the offset vertices located at ends of the offset figure sides associated with said first intersection point, and of said third intersection points thus found, the third intersection point nearer to said first intersection point is selected, and
of said parallel offset figure sides, the offset vertex associated with the offset figure side connected to the offset locus line segment containing said selected third intersection point and the offset vertices of the offset figure side associated with said first intersection point are deleted from said second vertex set, an intersection point is found at which the offset figure sides extending from said deleted offset vertices intersect each other, and said intersection point is stored in said second vertex set as a new vertex in place of said deleted vertices.

10. A computer readable storage medium having a reduction processing program stored thereon for causing a computer to execute program steps wherein reduction processing is applied to a difference figure generated by overlaying two geometric figures, to verify, based on the size of said difference figure, the validity of processing applied to each of said geometric figures, said program steps comprising:
a first vertex set storing step for storing a set of vertices included in said difference figure as a first vertex set;

an offset figure generating step for translating an imaginary straight line from each side of said difference figure inwardly of said figure by a distance equal to a prescribed sizing amount and thereby generating an offset figure bounded by said imaginary straight lines, and for storing a set of offset vertices included in said offset figure as a second vertex set;

an offset locus line segment generating step for generating an offset locus line segment by joining each vertex of said difference figure to one of said offset vertices that corresponds to said each vertex;

an intersection point detecting step for detecting the presence or absence of a first intersection point at which two offset locus line segments extending from adjacent vertices of said difference figure intersect each other;

a sorting step for sorting said first intersection point in order of increasing distance, based on the distance between said first intersection point and the side of said difference figure which is associated with said two offset locus line segments intersecting at said first intersection point; and a vertex revising step for computing a second intersection point which defines an intersection between two offset figure sides that extend from the offset vertices of said two offset locus line segments intersecting at said first intersection point selected by sorting, deleting said offset vertices associated with said selected first intersection point from said second vertex set, storing said second intersection point as a new vertex in said second vertex set, deleting from said first vertex set the vertices of said difference figure that are connected to said two offset locus line segments, and storing said selected first intersection point as a new vertex of said difference figure in said first vertex set.

11. A computer readable storage medium as claimed in claim 10, wherein said geometric figures are each generated by applying a different processing system.

12. A computer readable storage medium as claimed in claim 10 or 11 wherein, in said vertex revising step,
when said two offset figure sides are parallel to each other, and when said second intersection point does not exist,
a second imaginary straight line passing through said first intersection point and parallel to said two offset figure sides is generated, third intersection points are found each defining a point at which said second imaginary straight line intersects one of two offset locus line segments extending from the offset vertices located at ends of the offset figure sides associated with said first intersection point, and of said third intersection points thus found, the third intersection point nearer to said first intersection point is selected, and
of said parallel offset figure sides, the offset vertex associated with the offset figure side connected to the offset locus line segment containing said selected third intersection point and the offset vertices of the offset figure side associated with said first intersection point are deleted from said second vertex set, an intersection point is found at which the offset figure sides extending from said deleted offset vertices intersect each other, and said intersection point is stored in said second vertex set as a new vertex in place of said deleted vertices.

* * * * *